US006317426B1

(12) United States Patent
Afanador et al.

(10) Patent No.: US 6,317,426 B1
(45) Date of Patent: Nov. 13, 2001

(54) METHOD AND APPARATUS FOR HYBRID PROTECTION IN A SWITCHING NETWORK

(75) Inventors: Jairo Abraham Afanador, Lucas, TX (US); Masahiro Shimbashi, Kawasaki (JP); David X. Chen, Plano, TX (US)

(73) Assignee: Fujitsu Network Communications, Inc., Richardson, TX (US)

( * ) Notice: Subject to any disclaimer, the term of this patent is extended or adjusted under 35 U.S.C. 154(b) by 0 days.

(21) Appl. No.: 09/325,499

(22) Filed: Jun. 3, 1999

(51) Int. Cl.[7] .................................................. H04L 12/64
(52) U.S. Cl. ............................................ 370/352; 370/354
(58) Field of Search .................................. 370/352, 353, 370/354, 355, 225, 228, 216, 466, 469, 376; 340/825.01, 827

(56) References Cited

U.S. PATENT DOCUMENTS

| | | | |
|---|---|---|---|
| 4,339,633 | 7/1982 | Ahmed | 179/99 M |
| 4,631,641 | 12/1986 | Brombal et al. | 361/424 |
| 4,926,416 | * 5/1990 | Weik | 370/354 |
| 5,365,524 | 11/1994 | Hiller et al. | 370/94.2 |
| 5,398,236 | * 3/1995 | Hemmady et al. | 370/218 |
| 5,412,652 | 5/1995 | Lu | 370/85.12 |

(List continued on next page.)

FOREIGN PATENT DOCUMENTS

0818940A2   1/1998   (EP) ............................. H04Q/11/04

OTHER PUBLICATIONS

McDysan, David E., et al., *ATM Theory and Application.* McGraw–Hill, Inc. ISBN 0–07–060362–6, pp. 365–385. 1994.

Erdengiz, Ali, "ATM Usage Policing and Traffic Shaping," Communications System Design (Jan. 1997).

Dobrowski, George et al., ATM User–Network Interface Specification, Version 3.1, The ATM Forum. Sep. 1994.

Cerent 454™ High Speed SONET/SDH Transport System, ALTS trade show, Las Vegas, Nevada on or about Dec., 1998.

"FLM 150 ADM LAN Extension Product Design Specification," Revision 1.1, Internal Design Specification for Product, sheets 6/353–10/353 and 72/353–75/353. Product publicly released on or about Dec., 1998.

"Product Design Specification (PDS) for FLASH–192, Release 1," Internal Design Specification for Product, pp. 1/916;4–12/9161 315–320/916. Product publicly released on or about Mar., 1999.

(List continued on next page.)

*Primary Examiner*—Douglas Olms
*Assistant Examiner*—Ken Vanderpuye
(74) *Attorney, Agent, or Firm*—Baker Botts L.L.P.

(57) ABSTRACT

A hybrid protection circuit (10) operatively couples a plurality of communication paths in ingress cables (12) to a plurality of communication paths in egress cables (13). A line selector (31) effects protection switching of communication paths in one cable relative to communication paths in another cable, producing an output which is supplied to each of two switching sections (36, 37). The switching sections respectively effect switching according to a synchronous transport mode (STM) protocol, and an asynchronous transport mode (ATM) protocol. A multiplexer (57) selectively combines signals from the two switching sections, and supplies the result to a bridge circuit (61), which performs protection switching of these signals relative to communication paths in the respective egress cables (13). The hybrid protection circuit can be electrically configured to conform to one of various industry-standard protection techniques, including bidirectional line-switched ring (BLSR) protection, unidirectional path-switched ring (UPSR) protection, and one-plus-one (1+1) line protection.

16 Claims, 4 Drawing Sheets

U.S. PATENT DOCUMENTS

| | | |
|---|---|---|
| 5,467,348 | 11/1995 | Fujii et al. .......................... 370/60.1 |
| 5,519,700 * | 5/1996 | Punj ..................................... 370/419 |
| 5,838,924 | 11/1998 | Anderson et al. .............. 395/200.69 |
| 5,920,412 * | 7/1999 | Chong .................................. 359/128 |
| 5,963,553 * | 10/1999 | Wicklund ............................. 370/390 |
| 6,134,238 * | 10/2000 | Noh ...................................... 370/395 |

OTHER PUBLICATIONS

"InterNetworking Systems; AnyMedia® Access Products; AnyMedia Access System," http://www.lucent.com/ins/products/anymedia.html. Printed Aug. 10, 2000.

"AnyMedia® Access System,"Lucent Technologies, Inc. Marketing Communications. Sep., 1999.

"The AnyMedia™ Access System Anything's Possible," Lucent Technologies, Inc. Marketing Communications. 1997.

Photography of Northern Telecom Card, card dated Apr., 1998.

Held, G., *Understanding Data Communications*, Fifth Edition, Sams Publishing. ISBN No. 0–672–30934–3, Chapter 14, pp. 419–431. 1996.

McCloghrie, K., et al., "Management Information Base for Network Management of TCP/IP–based internets: MIB–II," SNMP Working Group. Mar., 1991.

"Draft New Recommendation 1.630 (ATM Protection Switching)," ITU Telecommunication Standardization Sector, COM 13–41–E. Sep., 1998.

Guérin, R., et al.,"Equivalent Capacity and its Application to Bandwidth Allocation in High–Speed Networks," IEEE Journal on Selected Areas in Communications, vol. 9, No. 7, pp. 968–981. Sep., 1991.

Gün, L., et al., "Bandwidth Management and Congestion Control Framework of the Broadband Network Architecture," Computer Networks and ISDN Systems 26, Elsevier Science Publishers B.V., North–Holland, pp. 61–78. 1993.

"S/DMS TransportNode 'OC–3 Express'—Cost–Effective SONET Transport for Low–Capacity Applications", northern Telecom Marketing Publications, Issue 1, pp. 1–31. Sep. 27, 1996.

Universal Serial Bus Specification Revision 1.1, Compaq Computer Corporation, Intel Corporation, Microsoft Corporation, NEC Corporation. Sep. 23, 1998.

"MMC Products," http://w.w.w.mc–net.com/top–roducts/productdescriptions.html, Printed Jul. 22, 1999.

"MMC Network's Products: AnyFlow 5400," http://www.mmcnet.com/Solutions/anyflow5400.asp. Printed Feb. 7, 2000.

"MMC Networks's products: AnyFlow 5500," http://w.w-.w.mmcnet.com/Solutions/anyflow5500.asp. printed Feb. 7, 2000.

"AnyFlow 5400 Product Overview," MMC Networks. Undated.

"AnyFlow 5500 Product Overview," MMC Networks. Undated.

SwitchStAR™ ATM Cell Based 8 X 8 Non–Blocking Single Chip Switching Memory, Preliminary IDT77V400, Commercial Temperature Range, Integrated Device Technology, Inc., pp. 1–23. May, 1998.

SwitchstAR™ ATM Cell Based 8 X 8 Non–Blocking Single Chip Switch Controller, Preliminary IDT77V500, Commercial Temperature Range, Integrated Device Technology, Inc., pp. 1–14. May, 1998.

Giroux, Natalie et al., *Traffic Management Specification*, Version 4.0 af–tm–0056.000, The ATM Forum, Apr., 1996.

M4 Interface Requirements and Logical MIB, af–nm–0020.000, The ATM Forum. Oct., 1994.

PCT International Search Report in International Application No. PCT/US00/15340, Oct. 19, 2000 6 pages Oct. 19, 2000.

* cited by examiner

METHOD AND APPARATUS FOR HYBRID PROTECTION IN A SWITCHING NETWORK

TECHNICAL FIELD OF THE INVENTION

This invention relates in general to a telecommunications network and, more particularly, to protection techniques which facilitate continuity of service notwithstanding faults which may develop in the telecommunications network.

BACKGROUND OF THE INVENTION

In existing telecommunications networks, one protocol used for communication is known as synchronous transport mode (STM). According to this protocol, a given user of a communication path is allocated time slices at predetermined periodic intervals. A second common communication protocol is known as asynchronous transport mode (ATM). According to this protocol, a given user of a communication path receives time slices which are not periodic, but instead occur at variable or random points in time.

Faults occasionally develop in a telecommunications network, for example when an underground cable is broken by construction equipment. Over time, various protection techniques have been developed to facilitate automatic rerouting of data so as to ensure reliable and substantially uninterrupted service.

One such technique is known as one-plus-one (1+1) line protection. According to this technique, each operational or working cable is associated with a corresponding protection or back-up cable. The working cable and protection cable both carry the same operational data streams, but the data streams on the protection cable are ignored until a fault is detected in association with the working cable. More specifically, when a fault is detected in association with the working cable, the system implements appropriate switching so as to stop using the data streams received through the working cable, and begin using the data streams received through the associated protection cable.

A second protection technique is known as bidirectional line-switched ring (BLSR) protection. In this approach, half of the communication paths in each cable are used for high priority data, and the other half are used for low priority data. If a fault is detected in association with the first cable, transmission of low priority data on both cables is terminated, and then the high priority information from the first cable is switched over to the low priority communication paths in the second cable, after which all of the communication paths in the second cable will be carrying high priority data until the fault can be repaired.

A third protection technique is known as unidirectional path-switched ring (UPSR) protection. According to this technique, the detection of a fault does not necessarily result in the switching of data streams from an entire group of communication paths in one cable to a corresponding group of communication paths in a different cable. Instead, protection switching is carried out on a one-to-one basis among communication paths.

Traditionally, entirely separate switching circuits have been provided for STM and ATM communications. The switching circuits for STM communications usually include use of a protection technique, such as one of the techniques described above. In contrast, switching circuits for ATM communications typically include little or no protection against interruption of service due to a fault. This is due in part to the fact that the amount of STM traffic was once much greater than the amount of ATM traffic. In recent years, however, due to the popularity of personal computers and the Internet, the amount of ATM traffic through telecommunication networks has been progressively increasing at a rapid rate. As one consequence, there has been a progressively increasing demand from network users for ATM traffic to enjoy the same level of protection and reliability that has traditionally been enjoyed by STM traffic.

The use of separate switching circuits for STM and ATM traffic has also presented some other disadvantages. Separate parts must be inventoried for each type of system, and maintenance personnel must be trained on each type of system, which involves additional expense. Further, in order to change the ratio of STM communication paths to ATM communication paths, it is typically necessary to manually and physically disconnect a cable from an STM or ATM switching circuit, and then physically couple it to the other type of switching circuit. This must occur at both ends of the cable, which are typically in remote locations. Further, since it is a manual operation, it is extremely slow in relation to the speed of automatic operation and switching of the system itself. Another disadvantage is that, since there is virtually no common switching circuitry shared by the ATM and STM networks, and since reserve circuitry is needed in each such network in order to permit variation of the ratio of STM to ATM communication paths, excess circuitry must be provided in each network, which also increases the cost of maintaining a telecommunications network that meets user needs.

SUMMARY OF THE INVENTION

From the foregoing, it may be appreciated that a need has arisen for a method and apparatus for effecting communication in a telecommunications network according to at least two different communication protocols, without providing completely separate and independent switching networks, but while providing reasonable protection for each protocol against interruptions in service due to network faults. According to the present invention, a method and apparatus are provided to address this need, and involve selectively establishing a plurality of switching paths which each couple a respective one of plural first communication paths to a respective one of plural second communication paths, and which each facilitate communication according to a selected one of several different communication protocols, wherein each first communication path can be selectively coupled by the switching arrangement to any one of the second communication paths according to any one of the communication protocols.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
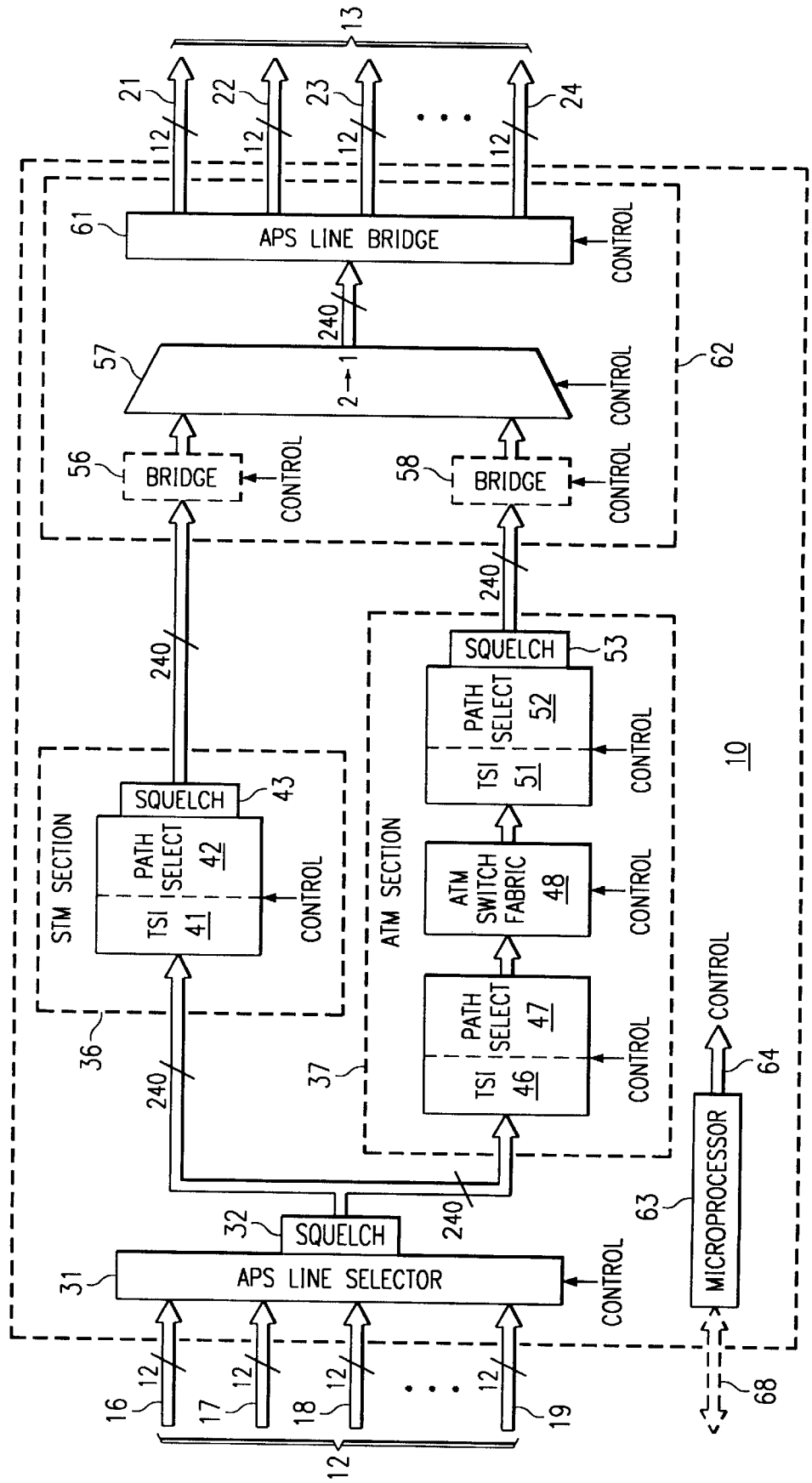
FIG. 1 is a diagrammatic view of a portion of a telecommunications network, including a plurality of ingress and egress cables, and hybrid protection circuitry which couples the ingress cables to the egress cables.

FIG. 1 is a diagrammatic view of a hybrid protection circuit 10 which is operatively coupled to a plurality of ingress cables 12 and a plurality of egress cables 13. The hybrid protection circuit 10 and the cables 12 and 13 represent a portion of an overall telecommunications network.

In the disclosed embodiment, there are twenty-four ingress cables 12, four of which are identified in FIG. 1 with reference numerals 16–19. Similarly, there are twenty-four egress cables 13, four of which are identified with reference numeral 21–24. The cables 12 and 13 are industry-standard cables, but are briefly described here for completeness, and to facilitate an understanding of the present invention. In particular, each of the cables 12 and 13 includes twelve communication paths. Each such communication path may, for example, be a respective fiber optic part. Data may be communicated through the communication paths in each cable according to various different protocols, which are standard in the industry.

One standard protocol is the synchronous transport mode (STM) protocol, and another industry standard protocol is the asynchronous transport mode (ATM) protocol. These protocols are both well known in the industry, and are therefore described here only briefly, for purposes of completeness, and to facilitate a thorough understanding of the present invention. Under the STM protocol, a given user receives time slices which are at predetermined periodic intervals. In contrast, under the ATM protocol, a given user receives time slices at non-periodic times which may be variable or random. A further characteristic of the ATM protocol is that information is sent along communication paths in packets of 53 bytes, each such packet being referred to as a "cell".

Since the ingress cables 12 include twenty four cables which each have twelve communication paths, the cables 12 include a total of 240 communication paths. Similarly, the twenty-four cables 13 include 240 communication paths. A purpose of the hybrid protection circuit 10 is to permit any one of the communication paths in the ingress cables 12 to be operatively coupled to any one of the communication paths in the egress cables 13, according to either the STM protocol or the ATM protocol, while providing protection against interruption of service due to a failure in the network.

Turning now in more detail to the hybrid protection circuit 10, each communication path in the ingress cables 12 is coupled to a respective one of 240 inputs of an automatic protection switching (APS) line selector 31. The line selector 31 can be variously configured to carry out line protection switching in the form of various different configurations, in a manner which is described in more detail below. The line selector 31 has 240 outputs which are coupled to respective inputs up a squelch circuit 32, the purpose for which is described later. The squelch circuit 32 has 240 outputs, which are each coupled to a respective one of 240 inputs of an STM section 36, and also to a respective one of 240 inputs of an ATM section 37. The STM section 36 effects switching at the path level according to the STM protocol, and the ATM section 37 effects switching at the path level and at the cell level according to the ATM protocol. The circuits 31 and 32 each contain circuitry of a type which is known in the industry.

With reference to the STM section 36, arriving signals pass successively through a time slot interchange (TSI) circuit 41, a path select circuit 42, and a squelch circuit 43. The TSI circuit 41 has 240 inputs and 240 outputs, and performs switching which can selectively couple each of its inputs to any of its outputs. The path select circuit 42 effects switching between communication paths within a cable. The squelch circuit 43 is provided for a purpose described later. The circuits 41, 42 and 43 each contain circuitry of a type which is known in the industry.

With respect to the ATM section 37, each signal received at the inputs passes successively through a TSI circuit 46, a path select circuit 47, an ATM switch fabric circuit 48, a further TSI circuit 51, a further path select circuit 52, and a squelch circuit 53. The circuits 46–48 and 51–53 each contain circuitry of a type which is known in the industry. Like the TSI circuit 41, the TSI circuits 46 and 51 are each capable of switching operations that can selectively couple each of its 240 inputs to any respective one of 240 outputs. The TSI 51 has the specific function of routing ATM traffic from the ATM switching fabric 48 into appropriate egress time slots for the egress cables 13. The path select circuits 47 and 52 are each similar to the path select circuit 42, and effect switching among respective communication paths. The ATM switching fabric 48 effects ATM switching at a cell level. The purpose of the squelch circuit 53 is described later.

The 240 outputs of the STM section 36 and the 240 outputs of the ATM section 37 are all coupled to respective inputs of an egress switching section 54. More specifically, the 240 outputs of the STM section 36 are coupled through an optional bridge circuit 56 to respective inputs of a 2:1 multiplexer 57. The 240 outputs of the ATM section 37 are coupled through an optional bridge circuit 58 to respective further inputs of the multiplexer 57. In effect, the multiplexer 57 may be viewed as 240 separate two-to-one multiplexers, which each select a respective output from either the STM section 36 or the ATM section 37 to be supplied to a respective one of the communication paths in the egress cables 13. Each of these 240 multiplexer circuits can be controlled independently of the others.

The multiplexer 57 has 240 outputs which are each coupled to a respective input of an APS line bridge circuit 61, which has 240 outputs that are each coupled to a respective communication path in the egress cables 13. The bridge circuit 61 carries out line protection in a manner analogous to the line selector circuit 31. The bridge circuits 56 and 58 are effectively redundant to the bridge circuit 61, and thus only the bridge circuit 61 or the ridge circuits 56 and 58 would be present. In the disclosed embodiment, the bridge circuit 61 is present, and the bridge circuits 56 and 58 are omitted. The circuits 56 and 58 are nevertheless shown in FIG. 1 in broken lines, for clarity and to facilitate an understanding of the present invention. However, it would alternatively be possible to omit the bridge circuit 61 and to use the bridge circuits 56 and 58 in order to implement the function of the circuit 61. The circuits 56–58 and 61 each contain circuitry of a type which is known in the industry.

The hybrid protection circuit 10 further includes a microprocessor control circuit 63, which produces at 64 a plurality of control signals for the rest of the hybrid protection circuit 10. Various control signals from 64 are supplied to respective portions of the circuit 10, including the line selector circuit 31, the TSI circuits 41, 46 and 51, the path select circuits 42, 47 and 52, the ATM switch fabric 48, the multiplexer 57, and the bridge circuit 61 (or bridge circuits 56 and 58). The microprocessor control circuit 63 may be coupled at 68 to other circuitry disposed at remote locations in the telecommunications network.

Figure 2:
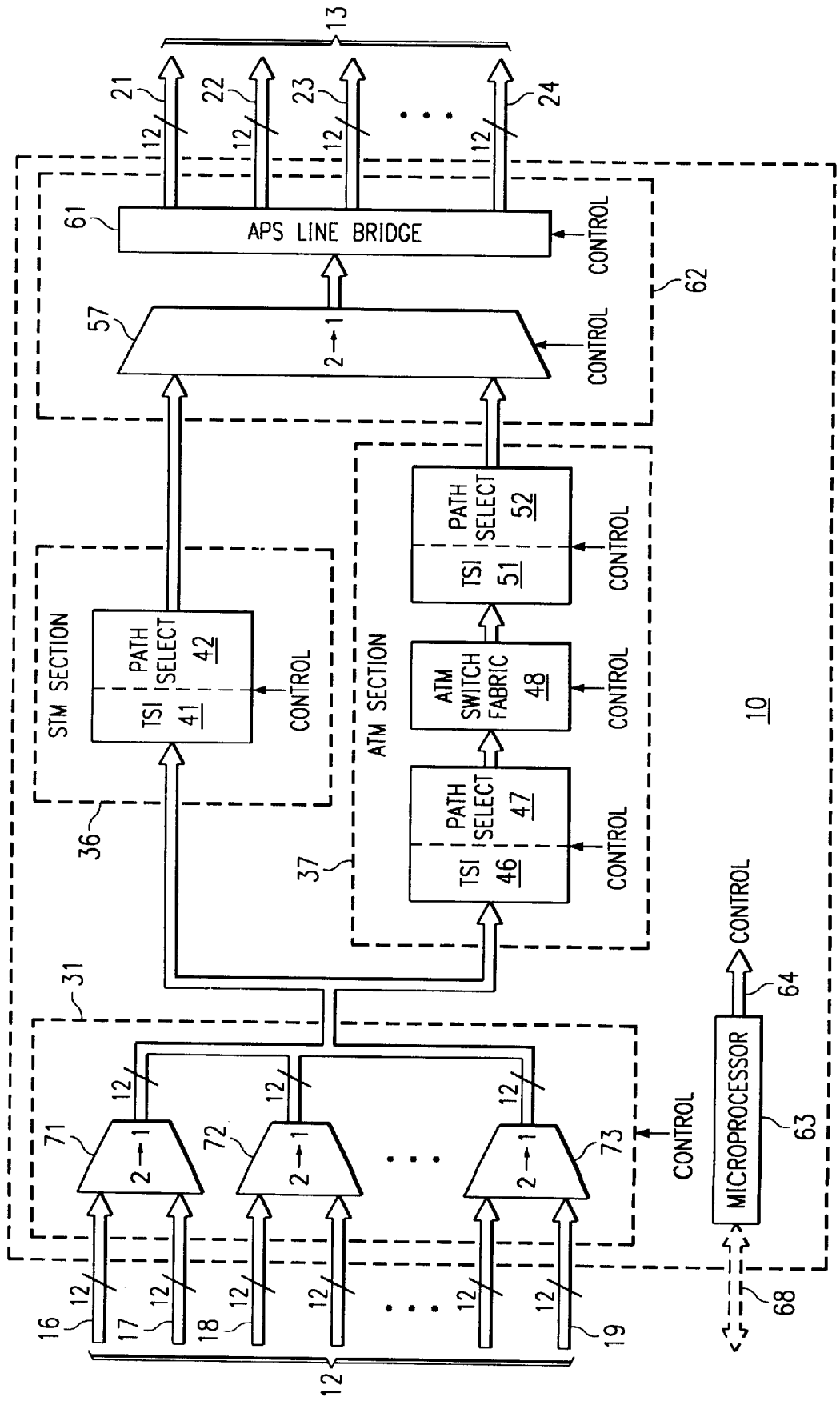
FIG. 2 is a further diagrammatic view of the circuitry of FIG. 1, diagrammatically showing how it can be configured to implement a one-plus-one (1+1) line protection technique.
Figure 3:
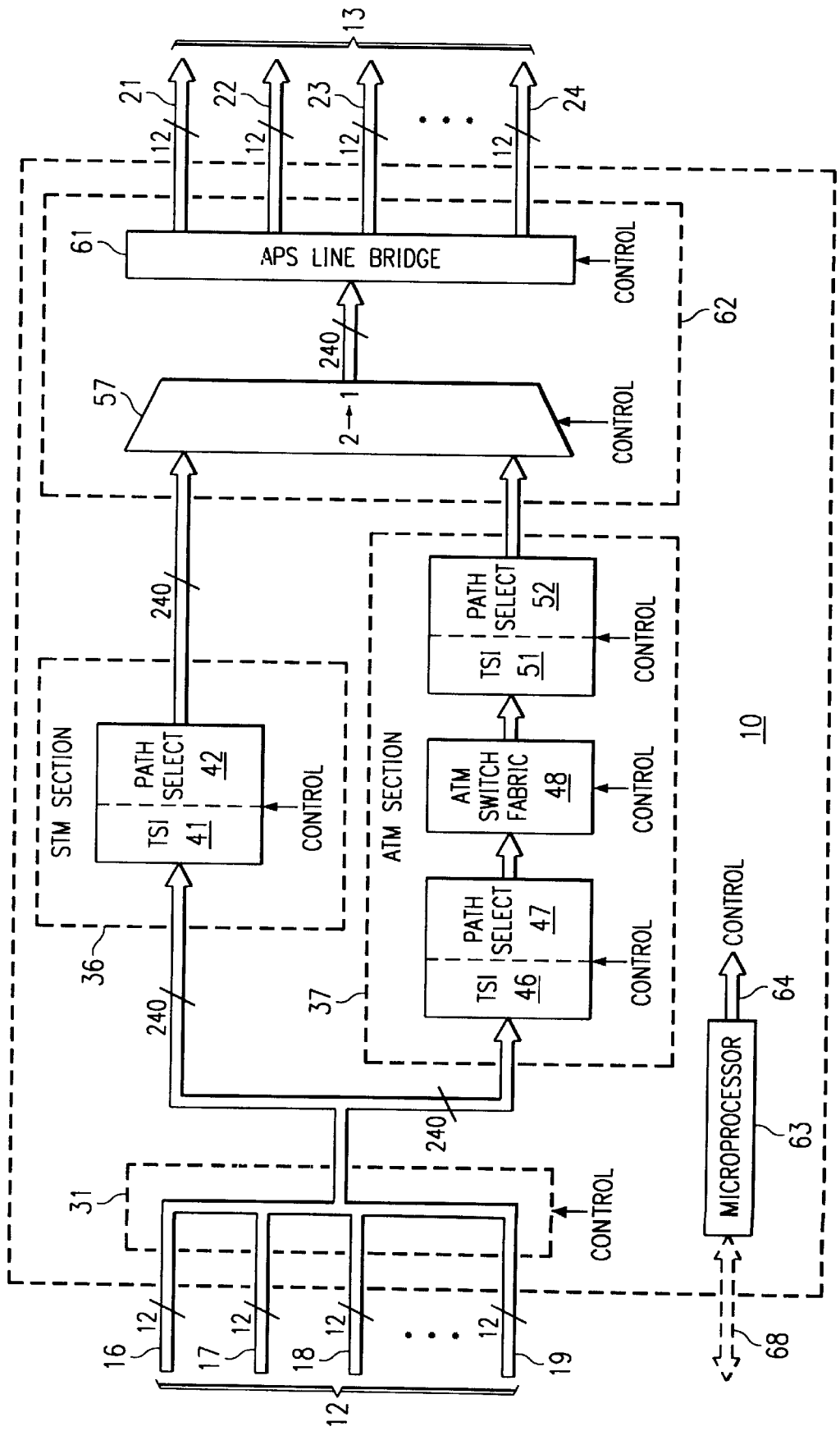
FIG. 3 is yet another diagrammatic view of the circuitry of FIG. 1, diagrammatically showing how it can be configured to implement a bidirectional line-switched ring (BLSR) protection technique.
Figure 4:
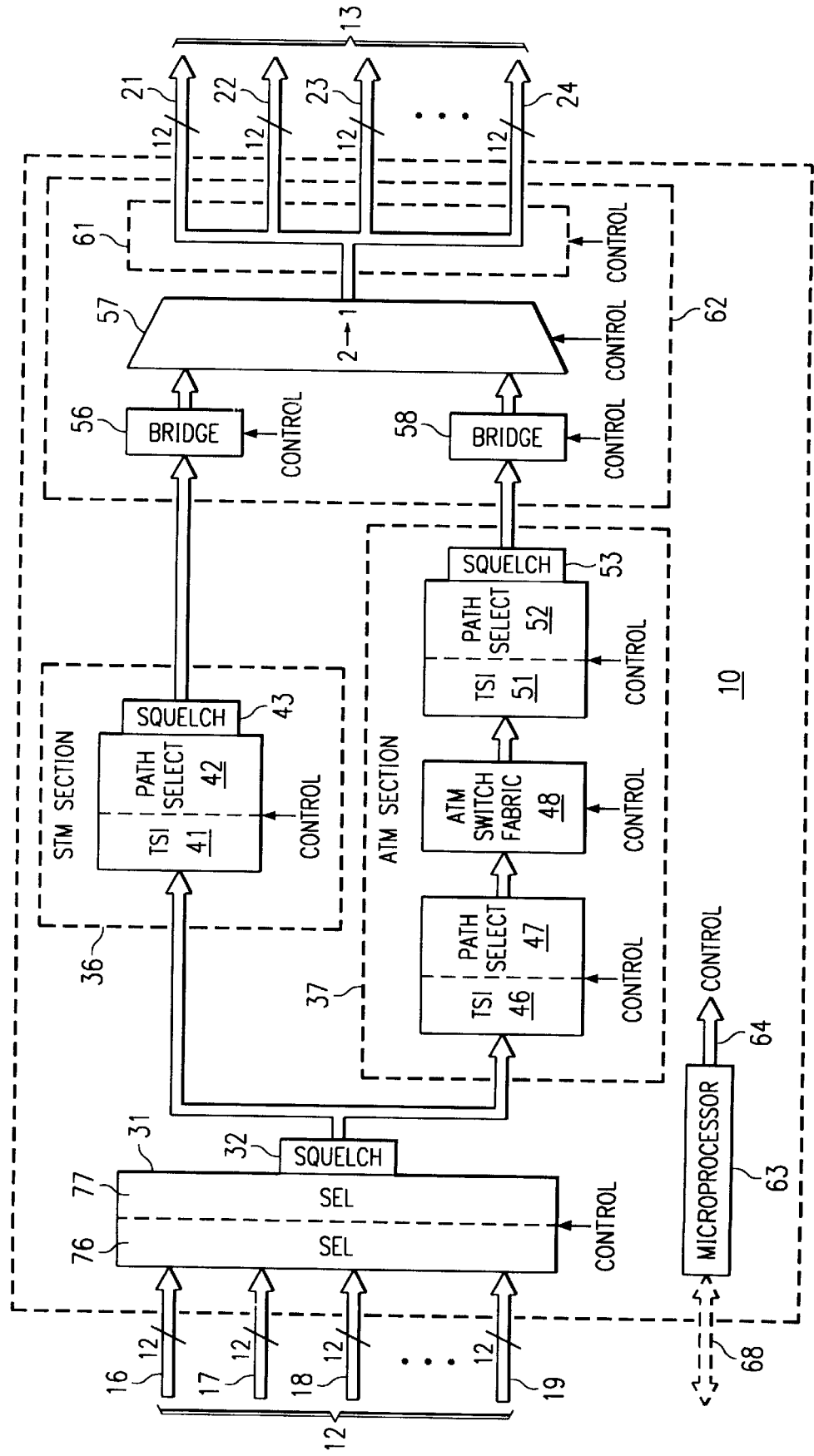
FIG. 4 is still another diagrammatic view of the circuitry of FIG. 1, diagrammatically showing how it can be configured to implement a unidirectional path-switched ring (UPSR) protection technique.

The hybrid protection circuit 10 of FIG. 1 has the advantage that it can be configured to be compatible with any of several different protection techniques that are already used in the industry. As discussed in more detail below with reference to FIGS. 2–4, these techniques include bidirectional line-switched ring (BLSR) protection, unidirectional path-switched ring (UPSR) protection, and one-plus-one (1+1) protection. FIGS. 2–4 each show the hybrid protection circuit 10 of FIG. 1 configured for operation according to a respective different one of these protection techniques. Since FIGS. 2–4 each depict the same hybrid protection circuit 10 as FIG. 1, only the portions relevant to each configuration are described below.

More specifically, FIG. 2 is a further diagrammatic view of the hybrid protection circuit 10 of FIG. 1, diagrammatically showing how this circuit can optionally be electrically configured to implement a one-plus-one (1+1) protection technique. According to the one-plus-one technique, the ingress cables 12 are organized in pairs, such that for each cable which is a working or operational cable, there is an associated protection or back-up cable. Egress cables 13 are paired in a similar manner. If any type of failure is detected with respect to the working cable or any of the twelve communication paths extending through it, then all traffic through the twelve communication paths of the working cable are switched over to the twelve communication paths of the corresponding protection cable.

For example, with reference to FIG. 2, the selector circuit 31 is operationally configured in a manner so that it appears to be twelve two-to-one selectors, three of which are diagrammatically depicted for clarity at 71–73 in FIG. 2. Thus, for example, cable 16 in FIG. 2 would be a working cable, and cable 17 would be the associated protection cable. During normal operation, the selector 71 would route the twelve communication paths of the working cable 16 to the outputs of selector 71, and ignore the cable 17. However, if any type of fault were detected with the cable 16 or one of its data paths, then the selector 71 would be switched so as to select the cable 17 and ignore the cable 16. When the hybrid protection circuit 10 of FIG. 1 is thus configured for use with the one-plus-one protection technique, the squelch circuits 32, 43 and 53 are unnecessary and may be disabled. Accordingly, although they may be present in the system, they would not be playing a functional role when the system is configured for one-plus-one operation, and they have therefore not been specifically shown in FIG. 2. It is important to remember that FIG. 2 is not disclosing an alternative embodiment of FIG. 1, but instead a diagrammatic view of one way in which the circuit of FIG. 1 can be electrically configured.

FIG. 3 is a further diagrammatic view of the circuit 10 of FIG. 1, showing diagrammatically how it would be operationally configured for operation according to the UPSR protection technique. According to the standard UPSR protection technique, all protection switching is performed at the path level rather than at the cable level. In other words, all protection switching is carried out in circuits 42, 47 and 52. Consequently, the selector 31 is electrically configured to be effectively transparent, or in other words to couple each of its 240 inputs to a respective one of its 240 outputs. The selector 31 is therefore shown in broken lines in FIG. 3, and FIG. 3 diagrammatically shows that each of the inputs of selector 31 is passed directly therethrough to a respective output.

FIG. 4 is a further diagrammatic view of the circuit 10 of FIG. 1, showing in a diagrammatic manner how it would be electrically configured for operation according to the BLSR protection technique. In the standard BLSR protection technique, each cable has six communication paths that are used as working paths, and six communicating paths that are used as protection paths. Unlike techniques such as the one-plus-one technique discussed above, the protection paths are not normally idle, but instead carry low priority data during normal operation of the network. If a fault is detected in association with a first cable, then transmission of the low priority data on the six protection paths of a second cable is terminated, and the information on the six working paths of the first cable is switched over to the protection paths of the second cable. The low priority data on the six working paths of the first cable is also terminated. With this in mind, FIG. 4 shows diagrammatically that the selector 31 is electrically configured so as to functionally appear to be two selector stages 76 and 77. The selector stage 76 switches twelve communication paths, or in other words switches one cable for another cable. The selector stage 77 switches six communication paths, or in other words switches six working paths relative to six protection paths.

Still referring to FIG. 4, and as mentioned above, when a fault is detected it is necessary to terminate transmission of the low priority data on some of the communication paths. In order to achieve this, one or more of the squelch circuits 32, 43, and 53 will generate an industry-standard alarm indication signal (AIS) on each of the communication paths for which the low priority data transmission needs to be terminated. These AIS signals are transmitted through one or more of the cables 13 to a downstream circuit, which may be a circuit similar to the circuit 10. In this manner, circuits downstream of the circuit 10 are made aware of the fact that information from working paths is being switched over to protection paths.

FIG. 4 also shows that the bridge circuits 56 and 58 are provided in place of the bridge circuit 61. This variation is not specific to the BLSR protection technique. In fact, all of the protection techniques discussed herein could be implemented using the circuit 10, regardless of whether it includes the single bridge circuit 61, or alternatively the two bridge circuits 56 and 58.

The present invention provides a number of technical advantages. One such technical advantage is that a single circuit is provided to handle two or more protocols such as STM and ATM, thereby avoiding the need to have an entirely separate switching system for each protocol. A single system is cheaper than two separate systems, and has lower maintenance costs. For example, there are fewer replacement parts to inventory, and maintenance personnel require training on only one system rather than two. A further advantage is that a cable can easily be switched from use according to one protocol to use according to a different protocol, without any need to manually effect a physical disconnection of a cable connector from one system and then a physical connection of that cable connector to another system. A further advantage is that the disclosed system implements protection for two protocols such as ATM and STM, whereas pre-existing systems usually implement protection for only a single protocol (such as STM), or no protection at all. Further, in the disclosed embodiment, two protocols such as STM and ATM share a common protection mechanism. Yet another advantage is that the disclosed system makes it easy to vary the ratio of communication paths used for one protocol (such as STM) relative to another protocol (such as ATM).

Although one embodiment has been illustrated and described in detail, it should be understood that various substitutions and alternations can be made therein without departing from the scope of the present invention. For example, the disclosed embodiment includes 240 communication paths organized as twenty-four cables each having twelve communication paths, but it will be recognized that the invention is compatible with a different number of communication paths or different configurations for cabling. In addition, the disclosed embodiment includes a particular configuration of circuit elements, including selector circuits, switching circuits and a multiplexer. However, it will be recognized that it is possible to vary the particular circuits used, or their particular configuration, while still realizing the present invention. A further consideration is that the disclosed embodiment is specifically designed to implement communication according to an ATM protocol or an STM protocol, but it will be recognized that the present invention is equally compatible with other protocols, or with more than two protocols. Other substitutions and alterations are also possible without departing from the spirit and scope of the present invention, as defined by the following claims.

What is claimed is:

1. An apparatus, comprising:
   a plurality of first communication paths;
   a plurality of second communication paths; and
   a switching arrangement operatively coupled to each of said first communication paths and to each of said second communication paths, said switching arrangement being operable to selectively establish a plurality of switching paths through said switching arrangement which each couple a respective one of said first communication paths to a respective one of said second communication paths, and which each facilitate communication according to a selected one of a plurality of different communication protocols, wherein each said first communication path can be selectively coupled by said switching arrangement to any one of said second communication paths according to any one of said communication protocols;
   wherein said switching arrangement includes a plurality of sections which each correspond to a respective said protocol, said switching paths each being routed through a respective one of said sections;
   including multiplexer circuitry coupled between said sections and said second communication paths;
   wherein a first of said sections includes a first path switching circuit;
   wherein a second of said sections includes a second path switching circuit, a cell switching circuit, and a third path switching circuit coupled in series; and
   wherein said path switching circuits each include a time slot interchange circuit and a path selection circuit coupled in series.

2. An apparatus according to claim 1, wherein said first section implements a synchronous transport mode (STM) protocol, and wherein said second section implements an asynchronous mode (ATM) protocol.

3. An apparatus, comprising:
   a plurality of first communication paths;
   a plurality of second communication paths; and
   a switching arrangement operatively coupled to each of said first communication paths and to each of said second communication paths, said switching arrangement being operable to selectively establish a plurality of switching paths through said switching arrangement which each couple a respective one of said first communication paths to a respective one of said second communication paths, and which each facilitate communication according to a selected one of a plurality of different communication protocols, wherein each said first communication path can be selectively coupled by said switching arrangement to any one of said second communication paths according to any one of said communication protocols;
   wherein said switching arrangement includes a plurality of sections which each correspond to a respective said protocol, said switching paths each being routed through a respective one of said sections;
   including multiplexer circuitry coupled between said sections and said second communication paths; and
   wherein each of said sections includes a squelch circuit which is operable to transmit an alarm indication signal on at least one of said switching paths.

4. An apparatus, comprising:
   a plurality of first communication paths;
   a plurality of second communication paths; and
   a switching arrangement operatively coupled to each of said first communication paths and to each of said second communication paths, said switching arrangement being operable to selectively establish a plurality of switching paths through said switching arrangement which each couple a respective one of said first communication paths to a respective one of said second communication paths, and which each facilitate communication according to a selected one of a plurality of different communication protocols, wherein each said first communication path can be selectively coupled by said switching arrangement to any one of said second communication paths according to any one of said communication protocols;
   wherein said switching arrangement includes a plurality of sections which each correspond to a respective said protocol, said switching paths each being routed through a respective one of said sections;
   including multiplexer circuitry coupled between said sections and said second communication paths;
   including first protection switching circuitry coupled between said first communication paths and said sections; and
   including second protection switching circuitry coupled between said sections and said second communication paths.

5. An apparatus according to claim 4, wherein said second protection switching circuitry includes a respective switching circuit coupled between each said section and said multiplexer circuitry.

6. An apparatus according to claim 4, wherein said second protection switching circuitry includes a switching circuit coupled between said multiplexer circuitry and said second communication paths.

7. An apparatus according to claim 4, wherein said sections each include a squelch circuit operable to transmit an alarm indication signal on at least one of said switching paths, and wherein said first protection switching circuitry includes a squelch circuit operable to transmit an alarm indication signal on at least one of said switching paths.

8. An apparatus according to claim 4, including a control circuit operative to control said first protection switching circuitry and said second protection switching circuitry so as to implement a bidirectional line-switched ring (BLSR) protection technique.

9. An apparatus according to claim 4, including a control circuit operative to control said first protection switching circuitry and said second protection switching circuitry so as to implement an unidirectional path-switched ring (UPSR) protection technique.

10. An apparatus according to claim 4, including a control circuit operative to control said first protection switching circuitry and said second protection switching circuitry so as to implement a one-plus-one line protection technique.

11. An apparatus according to claim 4, wherein said protocols include a synchronous transport mode (STM) protocol and an asynchronous transport mode (ATM) protocol, a first of said sections implementing said synchronous transport mode protocol, and a second of said sections implementing said asynchronous transport mode protocol.

12. An apparatus according to claim 4, wherein a first of said sections includes a first path switching circuit; and wherein a second of said sections includes a second path switching circuit, a cell switching circuit, and a third path switching circuit coupled in series.

13. A method of routing information from a plurality of first communication paths to a plurality of second communication paths using a switching arrangement, a first protection switching circuit, and a second protection switching circuit, comprising the steps of:
  selectively establishing a plurality of switching paths which each extend through said first protection switching circuit, said switching arrangement and said second protection switching circuit, and which each couple a respective one of said first communication paths to a respective one of said second communication paths; and
  effecting communication through each said switching path according to a selected one of a plurality of different communication protocols, wherein each said first communication path can be selectively coupled to any one of said second communication paths according to any one of said communication protocols.

14. A method of routing information from a plurality of first communication paths to a plurality of second communication paths using a switching arrangement, comprising the steps of:
  selectively establishing a plurality of switching paths through said switching arrangement which each couple a respective one of said first communication paths to a respective one of said second communication paths; and
  effecting communication through each said switching path according to a selected one of a plurality of different communication protocols, wherein each said first communication path can be selectively coupled to any one of said second communication paths according to any one of said communication protocols;

wherein said first communication paths are organized in groups corresponding to respective ingress cables, wherein said second communication paths are organized in groups corresponding to respective egress cables, and wherein said selectively establishing step includes the steps of:
    switching communication paths in each said ingress cable relative to communication paths in a different said ingress cable;
    thereafter routing a first subset of said switching paths through a first switching section implementing a first said protocol, including switching among switching paths of said first subset in said first section; and routing a different subset of said switching paths through a second switching section which implements a second said protocol, including switching among switching paths of said second subset, thereafter switching cells of information on said switching paths of said second subset, and thereafter switching among said switching paths of said second subset; and
    thereafter effecting switching of said switching paths from said first and second sections relative to respective said egress cables.

15. A method according to claim 14, wherein said step of effecting communication according to a selected one of a plurality of different communication protocols is carried out by using a synchronous transport mode (STM) protocol as one of said protocols, and by using an asynchronous transport mode (ATM) protocol as another of said protocols.

16. A method according to claim 14, wherein said switching arrangement includes first and second sections which each effect communication according to a respective one of said protocols, and wherein said selectively establishing step includes the step of routing information from each of said first communication paths through a respective one of said first and second sections.

* * * * *

UNITED STATES PATENT AND TRADEMARK OFFICE
CERTIFICATE OF CORRECTION

PATENT NO.    : 6,317,426 B1
DATED         : November 13, 2001
INVENTOR(S)   : Afanador et al.

It is certified that error appears in the above-identified patent and that said Letters Patent is hereby corrected as shown below:

<u>Title page,</u>
Item [75], Inventors, after "Jairo Abraham Afanador, Lucas, TX (US)", delete "Masahiro Shimbashi, Kawasaki, (JP)" and insert -- Masahiro Shinbashi, Kawasaki, (JP) --

Signed and Sealed this

First Day of October, 2002

Attest:

JAMES E. ROGAN
Attesting Officer  *Director of the United States Patent and Trademark Office*